United States Patent [19]

Tonar

[11] Patent Number: 5,448,397
[45] Date of Patent: Sep. 5, 1995

[54] OUTSIDE AUTOMATIC REARVIEW MIRROR FOR AUTOMOTIVE VEHICLES

[75] Inventor: William L. Tonar, Holland, Mich.

[73] Assignee: Gentex Corporation, Zeeland, Mich.

[21] Appl. No.: 142,875

[22] Filed: Oct. 29, 1993

Related U.S. Application Data

[63] Continuation of Ser. No. 907,055, Jul. 1, 1992, abandoned.

[51] Int. Cl.6 .............................................. G02F 1/153
[52] U.S. Cl. ..................................... 359/272; 359/267; 359/603; 359/614
[58] Field of Search ............... 359/267, 272, 275, 603, 359/604, 608, 839, 265, 601, 614, 605, 270, 271; 250/200, 206

[56] References Cited

U.S. PATENT DOCUMENTS 5,151,824  9/1992  O'Farrell ............................ 359/604

Primary Examiner—Georgia Y. Epps
Assistant Examiner—Thomas Robbins
Attorney, Agent, or Firm—Malcolm R. McKinnon

[57] ABSTRACT

An automatic electrochromic rearview mirror for automotive vehicles, the mirror being particularly adapted for use as an outside rearview mirror and incorporating improved means enabling the mirror to survive, over a relatively long useful life, extreme environmental conditions, such as extreme heat and/or cold, ultraviolet light exposure, alternate wetting, freezing and thawing conditions, exposure to salt spray and other corrosive conditions as well as high pressure sprays such as may be encountered in car wash facilities. Mirrors embodying the present invention may be manufactured and assembled with a minimum of breakage of glass components and/or rupture of sealing components during the manufacturing and assembly operations, and also incorporate improved means for increasing the efficiency of heating elements which may be utilized for defrosting purposes.

20 Claims, 2 Drawing Sheets

OUTSIDE AUTOMATIC REARVIEW MIRROR FOR AUTOMOTIVE VEHICLES

This is a continuation of application Ser. No. 07/907,055, filed Jul. 1, 1992 now abandoned.

BRIEF SUMMARY OF THE INVENTION

This invention relates to rearview mirrors for automotive vehicles and, more particularly, to an improved outside automatic rearview mirror for automotive vehicles.

Heretofore, various automatic rearview mirrors for automotive vehicles have been devised which automatically transfer from the full reflective mode (day) to the partial reflectance mode (night) for glare protection purposes from light emanating from the headlights of vehicles approaching from the rear. The electrochromic mirrors disclosed in U.S. Pat. No. 4,902,108, issued Feb. 20, 1990, for single-compartment, self-erasing, solution-phase electrochromic devices, solutions for use therein, and uses thereof, and U.S. Pat. No. 4,917,477, issued Apr. 17, 1990, for automatic rearview mirror system for automotive vehicles, each of which patents is assigned to the assignee of the present invention, are typical of modern day automatic rearview mirrors for automotive vehicles. Such electrochromic mirrors may be utilized in a fully integrated inside/outside rearview mirror system or as an inside or an outside rearview mirror system. In general, in automatic rearview mirrors of the type disclosed in U.S. Pat. Nos. 4,902,108 and 4,917,477, both the inside and the outside rearview mirrors are comprised of a thin chemical solution sandwiched and sealed between two glass elements. When the chemical solution is electrically energized, it darkens and begins to absorb light. The higher the voltage, the darker the mirror becomes. When the electrical voltage is removed, the mirror returns to its clear state. Also, in general, the chemical solution sandwiched and sealed between the two glass elements is comprised of solutions of electrochromic compounds which function as the media of variable transmittance in the mirrors. Such automatic rearview mirrors incorporate light sensing electronic circuitry which is effective to switch the mirrors to the night time mode when glare is detected, the sandwiched chemical layer being activated when glare is detected thereby darkening the mirror automatically. As glare subsides, the mirror glass returns to its normal clear state without any action being required on the part of the driver of the vehicle. The electrochromic compounds are disposed in a sealed chamber defined by a clear front glass, an edge seal, and a rear mirror element having a reflective layer, the electrochromic compound filling the chamber. Transparent conductive layers are provided on the inside of the glass elements, the transparent conductive layers being connected to the electronic circuitry which is effective to electrically energize the electrochromic compounds to switch the mirror to the night time mode when glare is detected.

While mirrors of the indicated character have operated satisfactorily, particularly as inside rearview mirrors in automotive vehicles, the useful life of such mirrors may be diminished when such mirrors are used as outside mirrors on automotive vehicles. For example, outside rearview mirrors must survive extreme environmental conditions such as extreme heat and/or cold, increased ultraviolet light exposure, alternate wetting and freezing followed by thawing conditions, exposure to salt spray and other corrosive sprays, and high liquid pressure sprays such as are encountered in car wash facilities. Heretofore, when outside automatic rearview mirrors have been exposed to extreme environmental conditions, difficulties have been encountered in maintaining suitable seals for the electrochromic compounds as well as the electrical connections thereto over a relatively long useful life. For example, heretofore efforts were made to seal the exterior automotive glass assemblies utilizing materials which were not ultraviolet stable with the result that it was necessary to paint exposed surfaces thereof in order to meet conventional outdoor ultraviolet light motor vehicle specifications. The problems encountered in masking areas that must not be painted, such as the mirror surfaces, are not trivial, and the cost of masking such areas during manufacture of the mirror resulted in a substantial increase in the manufacturing cost. Moreover, because of glass manufacturing tolerances, the glass mirror elements vary in thickness under mass production conditions. Because of such variations in thickness, it is difficult to obtain a long lasting, satisfactory seal to the front glass surface during manufacturing operations. This can result in excessive trimming operations to remove excess sealing material. Moreover, excessive clamping pressure during curing of the sealing material can tend to rupture the seal elements thereby causing premature seal element failure, and since the seal itself is normally not readily visible, such a defect is not readily apparent. In addition, since it is necessary for the electrochromic elements to have at least two wires for a connection to a power source, it is extremely difficult to seal the wire ports or connector assembly and at the same time prevent excessive molding material flash requiring subsequent removal during manufacturing operations.

An object of the present invention is to provide an improved automatic rearview mirror for automotive vehicles, which mirror incorporates improved means enabling the mirror to survive extreme environmental conditions, such as extreme heat and/or cold, ultraviolet light exposure, alternate wetting, freezing and thawing conditions, exposure to salt spray and other corrosive conditions, and high liquid pressure sprays such as may be encountered in car wash facilities.

Another object of the present invention is to provide an improved automatic rearview mirror incorporating improved means for sealing components of the mirror against air leaks, liquid leaks and other fluid leaks which could cause malfunctions in the operation of the mirror.

Another object of the present invention is to provide an improved automatic rearview mirror structure which enables the use of ultraviolet stable materials in the manufacture thereof thereby reducing or eliminating the necessity of painting exposed surfaces thereof in order to meet outdoor ultraviolet light motor vehicle specifications.

Another object of the present invention is to provide an improved automatic rearview mirror which eliminates the necessity of masking areas thereof during the manufacturing process thereby reducing the manufacturing costs.

Another object of the present invention is to provide an improved automatic rearview mirror which may be manufactured and assembled with a minimum of breakage of components thereof during the manufacturing and assembly operations.

Another object of the present invention is to provide an improved automatic rearview mirror incorporating improved sealing means providing multiple seals that have surprising resistance to high liquid pressure sprays such as are encountered in car wash facilities, and surprising resistance to freezing water, salt sprays and other extreme environmental conditions including ultraviolet light exposure.

Another object of the present invention is to provide an improved automatic rearview mirror assembly that may be directly substituted for plain mirror glass into many conventional outside rearview mirror housings and motorized mechanisms.

Another object of the present invention is to provide an improved automatic rearview mirror incorporating improved means of increasing the efficiency of heating elements which may be incorporated therein for defrosting purposes.

Another object of the present invention is to provide an improved automatic rearview mirror incorporating improved means for effecting improved sealing of the components thereof with a minimum reduction in the effective reflective area of the minor.

Another object of the present invention is to provide improved means for sealing structures incorporating glass components whereby such components may be assembled into a rugged unitary device capable of indoor and outdoor applications.

The above as well as other objects and advantages of the present invention will become apparent from the following description, the appended claims and the accompanying drawings.

DETAILED DESCRIPTION

In general, in automatic rearview mirrors embodying the present invention, the rearview mirror is comprised of a thin layer of a chemical solution sandwiched between two substantially fiat glass elements. As the chemical layer is electrically energized, it darkens and begins to absorb light. The higher the voltage, the darker the mirror becomes. When the electrical voltage is removed, the outside mirror returns to its clear state. Automatic rearview mirrors embodying the present invention may incorporate light sensing electronic circuitry of the type illustrated and described in U.S. Pat. No. 4,917,477, issued Apr. 17, 1990, for Automatic Rearview System for Automotive Vehicles, and assigned to the assignee of the present invention. Also, the electrochromic components of mirrors embodying the present invention may be of the type disclosed in U.S. Pat. No. 4,902,108, issued Feb. 20, 1990, for Single-Compartment, Self-Erasing, Solution-Phase Electrochromic Devices, Solutions for Use Therein, and Uses Thereof, and assigned to the assignee of the present invention. The entire disclosures of U.S. Pat. Nos. 4,917,477 and 4,902,108 are incorporated herein by reference.

Figure 4:
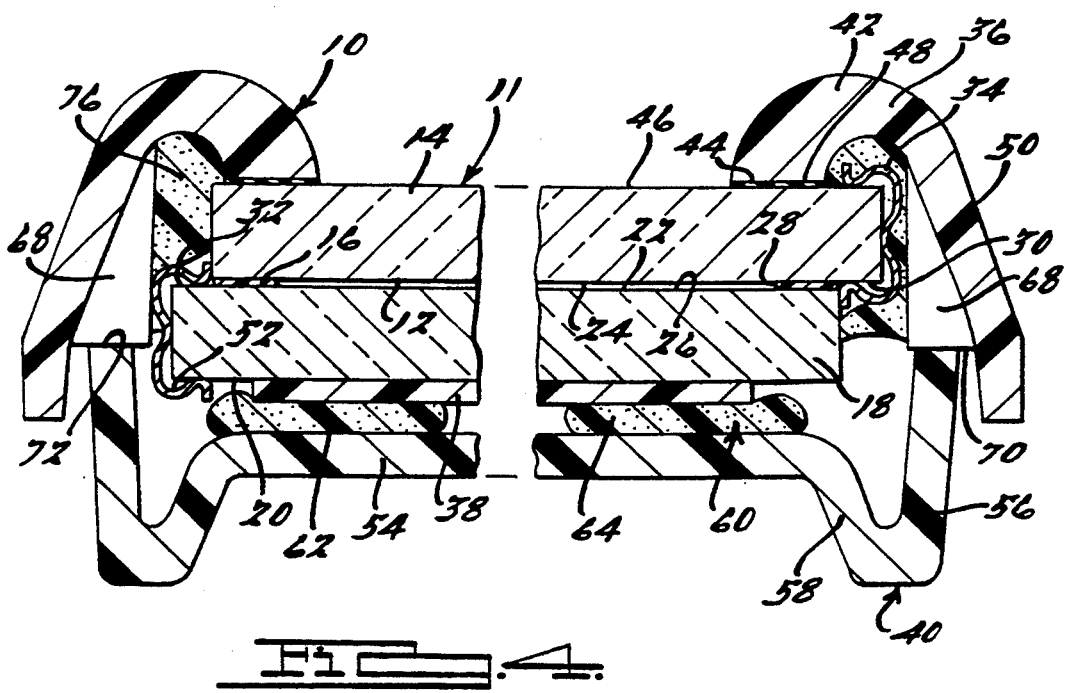
FIG. 4 is an enlarged cross-sectional view, with portions broken away for clarity of illustration, of the automatic rearview mirror illustrated in FIG. 1.

An electrochromic mirror, generally designated 10, embodying the present invention is depicted in simplified cross-section in FIG. 4. Since some of the layers of the mirror are very thin, the scale has been distorted for pictorial clarity. As shown in FIG. 4, the electrochromic assembly 11 includes a sealed chamber 12 defined by a clear front glass 14, an edge seal 16, and a clear rear glass 18 having a reflective layer 20. A chemical solution 22 having the desired electrochromic properties fills the chamber 12, and transparent conductive layers 24 and 26 are connected to an electrical circuit as will be described hereinafter in greater detail. Light rays enter through the front glass 14, the transparent conductive layer 24, the electrochromic layer 22, the transparent conductive layer 26, and the mirror glass layer 18 before being reflected from the reflective layer 20 provided on the mirror glass layer 18. Light in the reflected rays exit by the same general path traversed in the reverse direction. Both the entering rays and the reflected rays are attenuated in proportion to the degree to which the electrochromic layer 22 is light absorbing. When the electrochromic layer 22 is highly light absorbing, the intensity of the exiting rays is diminished, the dim image remaining being from light rays which are reflected off of the front and back surfaces of the front glass 14. Thus, the basic structural elements of the electrochromic assembly include two planar electrode-bearing sides or walls, a spacing and sealing layer 16, which spaces the walls apart and holds the walls in substantially parallel relationship in an assembled device, and which surrounds a volume which in an assembled device is comprised of electrode layers on the electrode-bearing walls as well as the circumferential inside walls 28 of the spacing and sealing layer 16. The volume of the chamber 12 is preferably filled with any of the solutions disclosed in U.S. Pat. No. 4,902,108 which have reversibly variable transmittance in the operation of the device, the solution in the chamber 12 being in contact with both electrode layers 24 and 26 during operation of the mirror.

Figure 3:
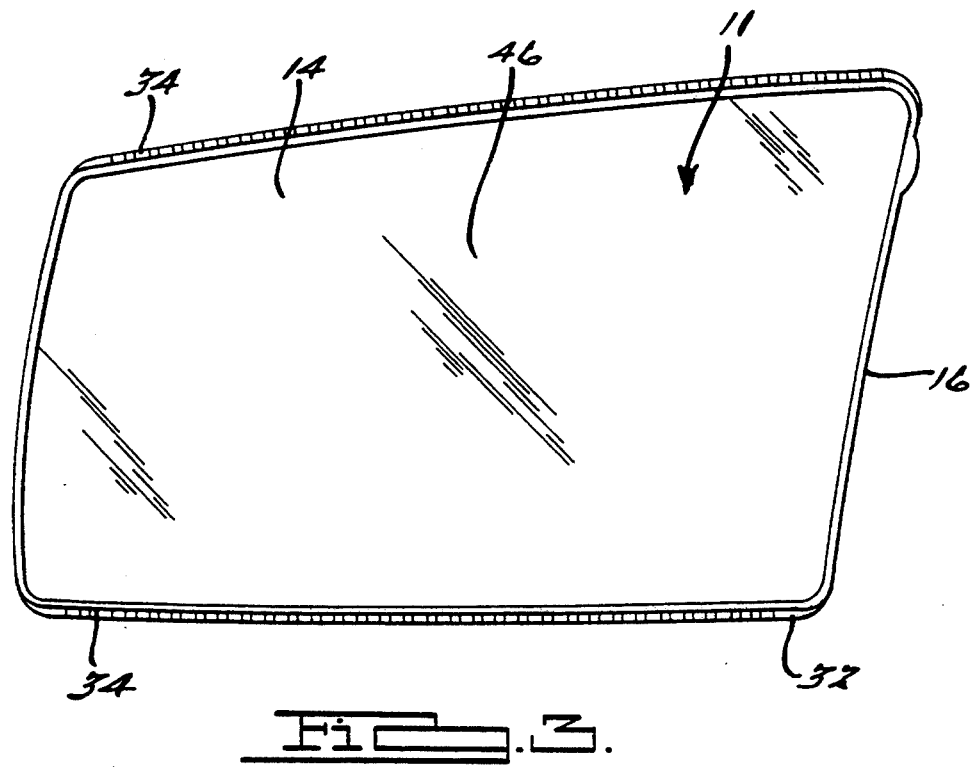
FIG. 3 is an elevational view of the electrochromic assembly incorporated in the rearview mirror illustrated in FIG. 1.

With reference to FIGS. 3 and 4, a preferred arrangement for connecting the electronic conductive layers 24 and 26 to a power source is illustrated. In this arrangement, the two electrode-bearing front and rear glass plates 14 and 18 are displaced is opposite directions, laterally from, but parallel to the chamber 12 in order to provide exposed areas 30 and 32. Electrically conductive spring clips 34 are provided which are placed on the coated glass sheets to make electrical contact to the exposed areas 30 and 32 of the transparent conductors 24 and 26, respectively. Suitable electrical conductors (not shown) may be soldered or otherwise connected to the spring clips so that desired voltage may be applied to the device from a suitable power source.

As illustrated in the drawings, automatic rearview mirrors 10 embodying the present invention include a bezel 36, the electrochromic assembly 11 previously described, a heater 38, and a mirror back 40 which is adapted to snap into an outside mirror housing (not shown) that may be of any desired configuration, the outside mirror housing being supported on the outside of the automotive vehicle in any desired or conventional manner whereby the field of view of the minor may be adjusted by the driver of the vehicle in a conventional manner, as for example through manual adjustment or by mechanical or electrical means of the type conventionally provided on modern day automobiles.

Figure 1:
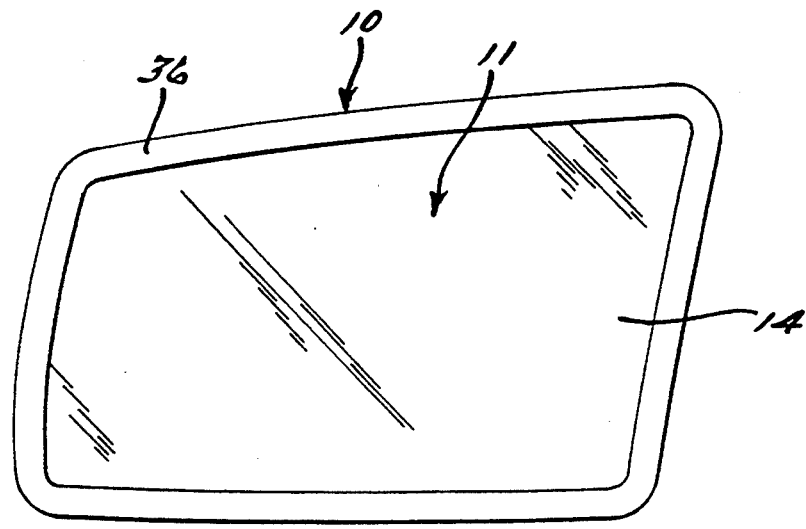
FIG. 1 is a front elevational view of an automatic rearview mirror embodying the present invention, the mirror being particularly adapted for use as an outside rearview mirror on automotive vehicles.

As shown in FIGS. 1 and 4, the bezel 36 surrounds the electrochromic assembly 11 in a circumferential manner, the bezel 36 overlying the electrochromic assembly 11 so as to conceal the edge portions thereof including the electrically conductive spring clips 34. The bezel includes an exposed, curvilinear main body portion 42 which extends around the entire circumference of the electrochromic mirror assembly 11. The main body portion 42 includes a flat surface 44 which is sealed to the exposed surface 46 of the glass element 14 through the agency of a glass sealant 48 which is preferably comprised, 60% by weight of a rubber based sealant such as HM-1081A dissolved in a VM+P naphtha solvent. The rubber based sealant 48 may be obtained from H. B. Fuller Company, 1200 Wolters Blvd. in Vaonais Heights, Minn., while the naphtha solvent may be obtained from Haviland Products Co., 421 Ann Street N.W., Grand Rapids, Mich. It has been found that if during the manufacturing operation the sealant 48 is only applied to approximately 25% of the area of the flat surface of the bezel, that the sealant will not weep out onto the exposed face of the glass but rather flows towards the periphery of the bezel with the result that an effective seal is obtained without weepage onto the exposed face of the glass that would require clean up operations during manufacture of the mirror. The bezel 36 also includes a skin portion 50 which extends around the entire periphery of the side edges of the electrochromic assembly 11 and also overlies the outside wall of the mirror back 40. The bezel itself is preferably injected molded from a plastic suitable for exterior automotive use such as Cadon 127 available from Monsanto Chemical Company, 800 N. Lindbergh Blvd., St. Louis, Mo. The electrical spring clips 34 may be formed from a tin plated strip of spring material such as half hard brass, phosphor bronze or beryllium copper, and the underside 52 of the clips 34 which contact the conductive layers on the glass elements are overcoated with a rubber based material such as Hyseal 5000 available from J. Dedos Inc., 400 Ann Street N.W., Grand Rapids, Mich., such rubber based material constituting approximately 33% of the overcoat which is dissolved in the VM+P naphtha solvent previously described. The clip contact overcoating may be approximately 0.005 to 0.010 inches thick. In the alternative, the Hyseal 5000 may be applied as 100% solids with a hot melt application.

If desired, outside mirrors embodying the present invention may also include the electrical heater 38 which functions to defrost the mirror, the heater 38 being a full surface heater such as those that are available from RayChem Corp. of Menlo Park, Calif. or from ITW Chronomatic of Chicago, Ill.

The mirror back 40 is preferably formed of the same material as the bezel, the mirror back 40 including a centrally disposed support plate portion 54 surrounded by an upstanding flange wall portion 56 integrally joined to the support plate portion by a bight portion 58. The heater 38 is preferably adhered to the adjacent surface of the reflective layer 20 on the glass plate 18 through the agency of a non-corrosive pressure sensitive adhesive or film such as AS-98 available from Adhesives Research Inc. in Glen Rock, Pa., or 3M-447 available from 3M Industrial Tape Division in Southfield, Mich. The centrally disposed support plate portion 54 of the mirror back 40 is preferably adhered to the heater through the agency of a non-corrosive elastomeric adhesive 60, such as Dow Coming 739 RTV available from Dow Coring Corporation in Midland, Mich., the mirror back adhesive 60 being in the form of spaced pad portions such as 62 and 64 disposed between the heater 38 and the support plate portion 54 of the mirror back 40, it having been found that it is preferable for the mirror back adhesive to cover only spaced areas rather than the entire support plate portion of the mirror back. It will be understood that it would be possible to print or deposit the electrical heater circuitry directly on the back of the glass plate rather than adhere a separate heater to the back of the glass plate. It has also been found that the defrost heater is surprisingly effective considering that the electrochromic assembly includes two layers of glass separated by an electrochromic solution and functions to defrost the exposed surface of the mirror encompassed by the bezel in a minimum of time.

Figure 2:
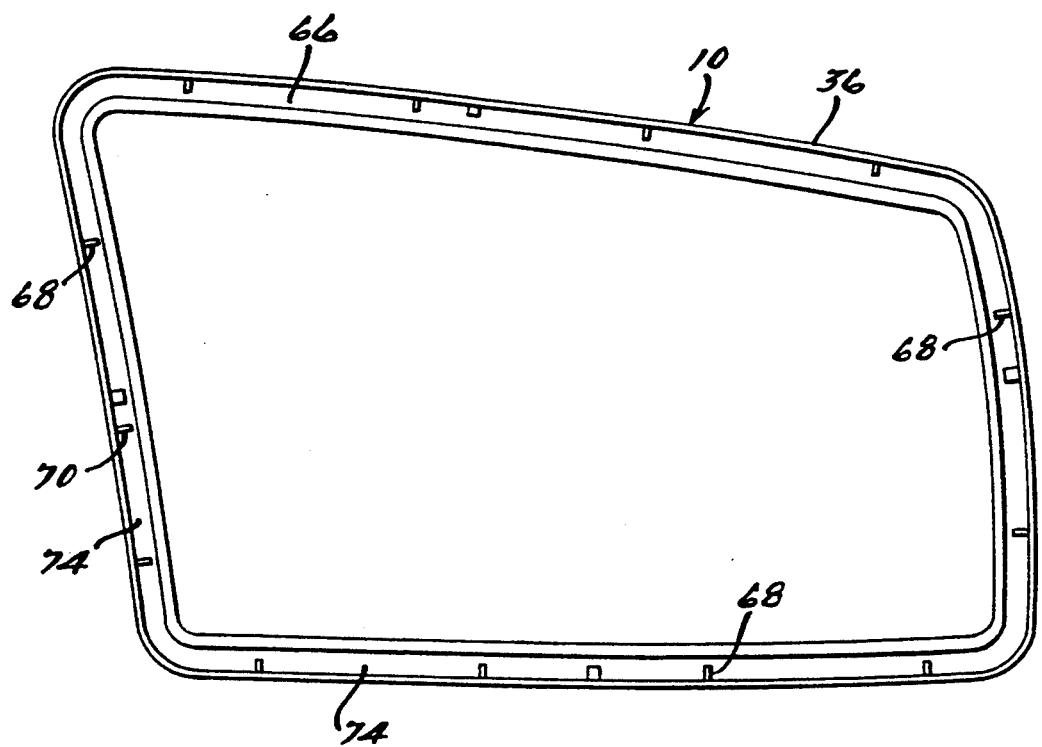
FIG. 2 is an elevational view of the reverse side of the bezel of the mirror illustrated in FIG. 1.

As shown in FIGS. 2 and 4, the reverse side 66 of the bezel 36 is provided with circumferentially spaced support ribs 68 each terminating in a knife-like edge 70 which engages, with substantially line contact, the flat surface 72 defining the ends of the upstanding wall 56 of the mirror back 40. The spaces 74 between the support ribs 68 are filled with a semi-flexible, water resistant potting compound 76 such as 50% by weight of Shell 828 epoxy resin, 20% by weight Shell 871 epoxy resin and 30% by weight of Ancamine 1768, which potting material functions as a secondary seal for the electrochromic assembly 11. With such a construction, the bezel and the associated electrochromic assembly constitutes an encapsulation vessel for the potting material during curing of the potting material which, when cured, forms a secondary sea/for the electrochromic assembly. In addition, the mirror is provided with a bezel to glass seal and the electrochromic solution itself is sealed between the two glass plates as previously described. It has been found that the clip contact overcoating prevents the potting material from seeping between the clip contacts and the conductive coating material so that the potting material does not interfere with the electrical contact between the clips and the electrically conductive coating provided on the glass plates. The Shell 828 and 871 epoxy resins may be obtained from the Shell Chemical Company in Houston, Tex., while the Ancamine 1768 may be obtained from Pacific Anchor Chemical Corporation, 1224 Mendon Road in Cumberland, R.I.

During the manufacture of the outside rearview mirrors embodying the present invention, the potting material 76 does not adhere to the knife-like edges 70 of the support ribs 68, and the potting material is only present in the spaces 74 between the support ribs 68. Accordingly, the assembly comprising the bezel 36 and the electrochromic assembly 11 tends to float on the knife-like edge supports thereby substantially preventing cracking of the glass elements due to tension or compression forces exerted on the glass elements during manufacturing operations. It has been found that if the mirror back is fastened around the entire periphery of the bezel, that tension and compression stresses may be encountered in the glass plates which will cause breaking of the glass elements during the manufacturing operations. With such a construction, the bezel overlies a minimum of the reflective surface area of the mirror elements, and at the same time conceals the electrical clips and the potting material thereby providing a maximum reflective viewing area for mirrors embodying the present invention. In practice it has been found, for example, that the entire assembly may be held together through the agency of elastic bands while the various adhesives and the potting material are in the curing stages.

From the foregoing it will be appreciated that the present invention enables the provision of a multiple sealed electrochromic mirror that has surprising resistance to car washes, freezing water, salt sprays and other adverse conditions that may be encountered when the mirror is utilized as an outside rearview mirror on an automotive vehicle. There is a minimum of moisture permeation and a minimum of oxygen permeation through the sealants thereby preventing adverse penetration of moisture and oxygen to the electrochromic assembly including the electrical contacts with the result that the useful life of the mirror is substantially increased.

While a preferred embodiment of the invention has been illustrated and described, it will be understood that various changes and modifications may be made without departing from the spirit of the invention.

What is claimed is:

1. An automatic rearview mirror for automotive vehicles, said mirror comprising, in combination, a pair of planar, parallel, spaced elements defining a chamber therebetween, one of said elements being transparent, the confronting sides of said elements each being coated with a layer of electrically conductive material, said chamber being substantially filled with a solution of reversibly variable transmittance in contact with said electrically conductive layers, the other of said elements having a reflective layer of high reflectance material on the side thereof remote from the electrically conductive material, said reflective layer reflecting, through said solution and the transparent element, light which reaches said reflective layer after passing through the solution and through the transparent element, bezel means having a substantially flat surface thereon extending around and covering the periphery of the exposed surface of said transparent element on the side thereof opposite the conductive layer, spring clip means providing electrical connections to each of said electrically conductive layers, first sealing means sealing the periphery of said chamber, second sealing means sealing the flat surface of said bezel to said exposed side of said transparent element to create a vessel, and third sealing means filling the vessel and encapsulating said clip means and the peripheral edge portions of said elements adjacent said clip means.

2. The combination as set forth in claim 1 including electrical heater means fixed to said reflective layer in sealing engagement therewith.

3. The combination as set forth in claim 2 including a back member having a substantially flat central support portion and a peripheral wall portion integrally joined to said central portion by a bight portion, and means adhesively connecting spaced areas of said central support portion to said heater means.

4. The combination as set forth in claim 3, said bezel means including a circumferentially extending skirt overlying said peripheral wall portion of said back member.

5. The combination as set forth in claim 4, said bezel means including a plurality of circumferentially spaced ribs on the side thereof confronting said transparent element, said ribs having substantially line contact with the end surfaces of the peripheral wall portion of said back member, said encapsulating sealing means being disposed intermediate said ribs.

6. An automatic outside rearview mirror for automotive vehicles, said mirror comprising, in combination, a pair of planar, parallel, spaced glass elements defining a chamber therebetween, one of said glass elements being transparent, the confronting sides of said elements each being coated with a layer of electrically conductive material, said chamber being substantially filled with a solution of reversibly variable transmittance in contact with said electrically conductive layers, the other of said elements having a reflective layer of high reflectance material on the side thereof opposite the electrically conductive material, said reflective layer reflecting, through said solution and the transparent element, light which reaches said reflective layer after passing through the solution and through the transparent element, bezel means having a substantially flat surface thereon extending entirely around and covering the marginal periphery of the exposed surface of said transparent element on the side thereof opposite the conductive layer, spring clip means providing electrical connections to each of said electrically conductive layers, first sealing means sealing the periphery of said chamber, second sealing means sealing the flat surface of said bezel to said exposed side of said transparent element to create a vessel, and third sealing means filling the vessel and encapsulating the peripheral edge portions of said elements adjacent said clip means.

7. The combination as set forth in claim 6 including a back member having a substantially flat central support portion and a peripheral wall portion integrally joined to said central portion, said bezel means including a circumferentially extending skirt overlying said peripheral wall portion of said back member.

8. The combination as set forth in claim 7, said bezel means including a plurality of circumferentially spaced ribs on the side thereof confronting said transparent element, said ribs having substantially line contact with the end surfaces of the peripheral wall portion of said back member, said encapsulating sealing means being disposed intermediate said ribs.

9. The combination as set forth in claim 8 including electrical heater means fixed to said reflective layer in sealing engagement therewith.

10. The combination as set forth in claim 8, said clip means being coated on the sides thereof in contact with said conductive layers.

11. An electronically dimming rearview mirror for automotive vehicles, said mirror comprising, in combination, a pair of spaced elements defining a chamber therebetween, one of said elements being transparent, the confronting sides of said elements each including a layer of electrically conductive material, said chamber containing a reversibly variable transmittance medium in contact with said electrically conductive layers, the other of said elements including reflecting means for reflecting, through said medium and the transparent element, light which reaches said reflecting means after passing through the medium and through the transparent element, bezel means having a surface thereon extending around and covering the periphery of the exposed surface of said transparent element on the side thereof opposite the conductive layer, current bus means providing high conductance electrical connections to each of said electrically conductive layers, first sealing means sealing the periphery of said chamber, second sealing means sealing the surface of said bezel to said exposed side of said transparent element to create a vessel, and third sealing means filling the vessel and encapsulating said current bus means and the peripheral edge portions of said elements adjacent said current bus means.

12. The combination as set forth in claim 11 including electrical heater means fixed to said other element in sealing engagement therewith.

13. The combination as set forth in claim 12 including a back member having a central support portion and a peripheral portion integrally joined to said central portion by a connecting portion, and means adhesively connecting said back member to the rear portion of the mirror.

14. The combination as set forth in claim 13, said bezel means including a circumferentially extending skirt overlying said peripheral wall portion of said back member.

15. The combination as set forth in claim 14, said bezel means including a plurality of circumferentially spaced ribs on the side thereof confronting said transparent element, said encapsulating sealing means being disposed intermediate said ribs.

16. An electronically dimming outside rearview mirror for automotive vehicles, said mirror comprising, in combination, a pair of spaced elements defining a chamber therebetween, one of said elements being transparent, the confronting sides of said elements each being coated with a layer of electrically conductive material, said chamber being substantially filled with a medium of reversibly variable transmittance in contact with said electrically conductive layers, the other of said elements having a reflective layer of high reflectance material, said reflective layer reflecting, through said medium and the transparent element, light which reaches said reflective layer after passing through the medium and through the transparent element, bezel means having a surface thereon extending entirely around and covering the marginal periphery of the exposed surface of said transparent element on the side thereof opposite the conductive layer, current bus means providing high conductance electrical connections to each of said electrically conductive layers, first sealing means sealing the periphery of said chamber, second sealing means sealing the surface of said bezel to said exposed side of said transparent element to create a vessel, and third sealing means filling the vessel and encapsulating the peripheral edge portions of said elements adjacent said current bus means.

17. The combination as set forth in claim 16 including a back member having a central support portion and a peripheral portion integrally joined to said central portion, said bezel means including a circumferentially extending skirt overlying said peripheral portion of said back member.

18. The combination as set forth in claim 17, said bezel means including a plurality of circumferentially spaced ribs on the side thereof confronting said transparent element, said encapsulating sealing means being disposed intermediate said ribs.

19. The combination as set forth in claim 18 including electrical heater means fixed to said reflective layer in sealing engagement therewith.

20. The combination as set forth in claim 18, whereon said current bus means is a metal clip, said metal clip being coated on the sides thereof in contact with said conductive layers.

* * * * *